(12) United States Patent
Weber

(10) Patent No.: US 6,196,259 B1
(45) Date of Patent: Mar. 6, 2001

(54) METHOD AND APPARATUS FOR REGULATING AND TERMINATING FLUID FLOW

(75) Inventor: Robert T. Weber, Dallas, TX (US)

(73) Assignee: Flow Design, Inc., Dallas, TX (US)

( * ) Notice: Subject to any disclaimer, the term of this patent is extended or adjusted under 35 U.S.C. 154(b) by 0 days.

(21) Appl. No.: 09/265,525

(22) Filed: Mar. 8, 1999

Related U.S. Application Data

(60) Provisional application No. 60/077,806, filed on Mar. 12, 1998.

(51) Int. Cl.⁷ .................................................... G05D 7/01
(52) U.S. Cl. ............................................ 137/504; 137/517
(58) Field of Search ................................... 137/501, 503, 137/504, 517

(56) References Cited

U.S. PATENT DOCUMENTS

| | | | |
|---|---|---|---|
| 2,136,898 | * | 11/1938 | Thomas ................................. 137/517 |
| 2,584,418 | * | 2/1952 | Branson ............................... 137/504 |
| 2,668,555 | | 2/1954 | Bartolat . |
| 2,967,543 | | 1/1961 | Viergutz . |
| 3,196,902 | | 7/1965 | Richmond . |
| 3,424,196 | | 1/1969 | Donner . |
| 3,472,275 | | 10/1969 | Castro et al. . |
| 3,590,861 | | 7/1971 | Chittenden . |
| 3,626,976 | | 12/1971 | Kraakman . |
| 3,752,183 | * | 8/1973 | Griswold ............................. 137/504 |
| 3,805,824 | | 4/1974 | Robbins, Jr. . |
| 3,854,497 | | 12/1974 | Rosenberg . |
| 4,080,993 | | 3/1978 | Lind ..................................... 137/504 |

(List continued on next page.)

FOREIGN PATENT DOCUMENTS

| | | |
|---|---|---|
| 676 384 A5 | 1/1991 | (CH) . |
| 1 945 785 | 3/1970 | (DE) . |
| 36 34 427 A1 | 4/1988 | (DE) ................................. G05D/7/01 |
| 0 161 348 A2 | 11/1985 | (EP) ............................... F16K/17/04 |
| 970737 | 1/1951 | (FR) . |
| 2 253 413 | 6/1975 | (FR) . |
| 947040 | 1/1964 | (GB) . |
| 2 072 806 | 10/1981 | (GB) . |
| 2 300 696 | 11/1996 | (GB) ............................... F16K/17/34 |
| 9-42518 | 2/1997 | (JP) ............................... F16K/31/122 |
| WO 97/05414 | 2/1997 | (WO) ............................. F16K/17/26 |

OTHER PUBLICATIONS

PCT International Search Report, mailed Jul. 1, 1999, International Application No. PCT/US 99/04673, filed Mar. 4, 1999.
PCT International Search Report, mailed Jul. 12, 1999, International Application No. PCT/US 99/05225, filed Mar. 10, 1999.
PCT International Search Report, International Application No. PCT/US 99/05225, Mar. 10, 1999.

*Primary Examiner*—Stephen M. Hepperle
(74) *Attorney, Agent, or Firm*—Baker Botts L.L.P.

(57) ABSTRACT

A fluid valve for controlling flow of a fluid from an upstream region to a downstream region includes a housing having a fluid exit, a fluid entry member having a sidewall, and a shut-off member associated with the housing. The sidewall and the fluid entry member is formed with at least one regulating aperture for receiving fluid from the upstream region and a second aperture for receiving fluid from the upstream region. The fluid entry member is movably disposed within the housing such that the at least one regulating aperture has an effective area exposed to the upstream region that decreases as a pressure differential between the upstream region and the downstream region increases. The shut-off member is associated with the housing and the fluid entry member such that fluid flow through the second aperture is prevented when the difference in fluid pressure between the upstream region and the downstream region exceeds a desired value.

8 Claims, 3 Drawing Sheets

U.S. PATENT DOCUMENTS

| | | | |
|---|---|---|---|
| 4,112,978 | * 9/1978 | Olbrich et al. | 138/30 |
| 4,766,928 | 8/1988 | Golestaneh | 137/504 |
| 4,825,916 | * 5/1989 | Fink, Jr. | 141/392 |
| 5,174,330 | 12/1992 | Golestan et al. | 137/504 |
| 5,462,081 | 10/1995 | Perusek et al. | 137/498 |

* cited by examiner

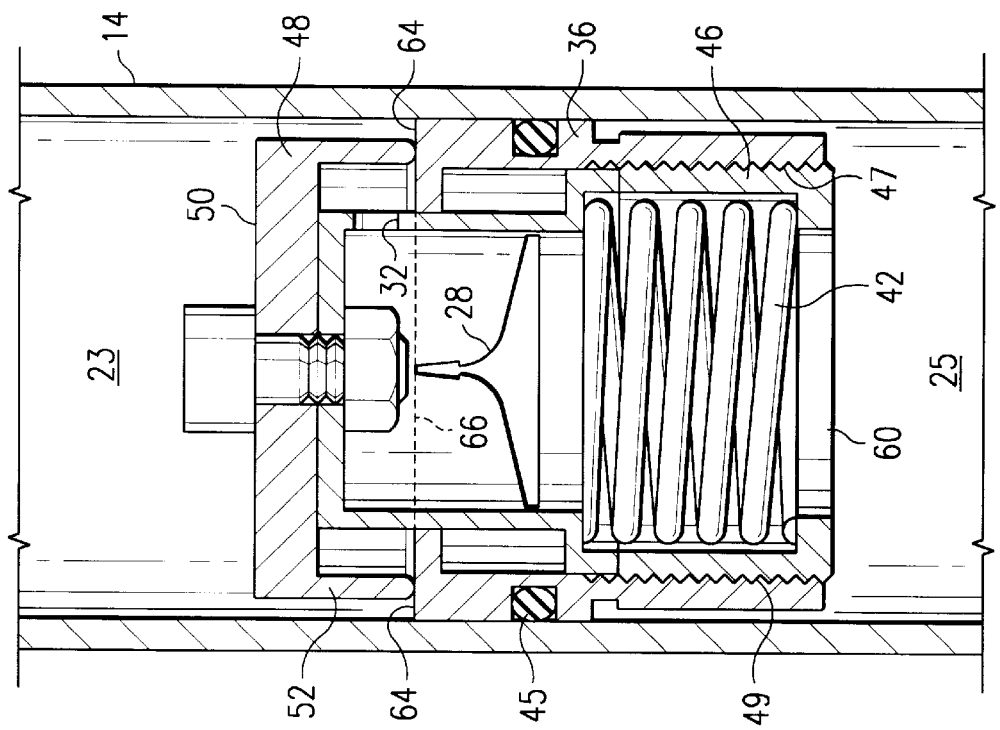
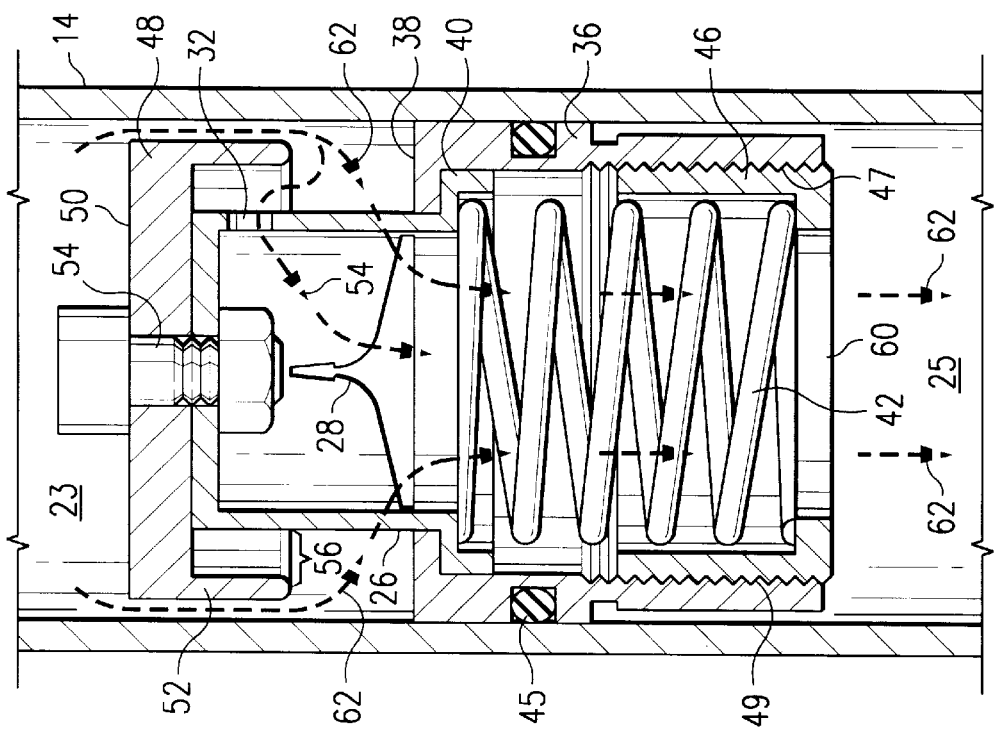

METHOD AND APPARATUS FOR REGULATING AND TERMINATING FLUID FLOW

RELATED APPLICATIONS

This application claims the benefit of U.S. Provisional Application Ser. No. 60/077,806, filed Mar. 12, 1998.

TECHNICAL FIELD OF THE INVENTION

This invention relates generally to fluid valves and more particularly to a method and apparatus for regulating and terminating fluid flow.

BACKGROUND OF THE INVENTION

Constant flow rate control valves have numerous applications in piping networks. For example, in a building air conditioning and heating system, water or other liquid at an appropriate control temperature is pumped from a central station through a piping network to various heat exchange units located throughout the building. Some of these heat exchange units are located relatively close to the central station while others are located much farther away. The fluid pressure applied across inputs and outputs of the respective heat exchange units varies widely because of factors such as frictional losses inherent in the flow of the liquid through the piping network and the distances the liquid must travel. To provide a constant flow rate in each branch of the network, constant flow rate control valves may be used.

A constant flow rate control valve provides a relatively constant fluid flow through the valve for varying pressure differentials. Therefore, constant flow rates within various branches of a piping network may be maintained even in the existence of varying fluid pressures within the branches. One example of a constant flow rate control valve is described in U.S. patent application 5,174,330, assigned to Flow Design, Inc. The '330 Patent describes a constant flow rate control valve that provides a constant flow rate for varying pressure differentials by regulating the amount of flow area through which fluid may flow. The regulation of the amount of flow area is performed by providing apertures in a portion of the device that are covered as the pressure differential increases. Such devices conventionally provide a relatively constant flow rate over a range of pressure differentials; however, they do not regulate flow for pressure differentials in excess of that range. Therefore, after a maximum pressure differential is exceeded, flow continues to flow unregulated and increases with increasing pressure differential.

A previously unrecognized problem with a valve continuing to provide increasing flow rate after a maximum pressure differential is reached, is that whenever the maximum pressure is exceeded, no flow is likely to be desired, rather than unregulated flow. For example, a constant rate control valve may be used to regulate flow of gasoline from a storage area to an output nozzle, such as used in gas stations. If for some reason, a conduit connecting the storage tank to the nozzle were to rupture or become flawed on the downstream side of such a control valve, the resulting loss in pressure in the downstream region would cause an increase in pressure differential across the valve. If such an increase exceeded the maximum pressure differential of a constant rate control valve, the rate of fluid flow through the valve and to the ruptured conduit would increase, and the gasoline would exit the ruptured conduit. Such flow of gasoline is dangerous. Therefore, in this example, after a maximum pressure is reached, it is desirable to prevent flow through the constant flow rate valve.

SUMMARY OF THE INVENTION

Accordingly, a need has arisen for an improved method and apparatus for regulating and terminating fluid flow. The present invention provides a method and apparatus for regulating and terminating fluid flow that addresses shortcomings of prior apparatuses and systems.

According to one embodiment of the invention, a fluid valve for controlling flow of a fluid from an upstream region to a downstream region includes a housing having a fluid exit, a fluid entry member having a sidewall, and a shut-off member associated with the housing. The sidewall and the fluid entry member is formed with at least one regulating aperture for receiving fluid from the upstream region and a second aperture for receiving fluid from the upstream region. The fluid entry member is movably disposed within the housing such that the at least one regulating aperture has an effective area exposed to the upstream region that decreases as a pressure differential between the upstream region and the downstream region increases. The shut-off member is associated with the housing and the fluid entry member such that fluid flow through the second aperture is prevented when the difference in fluid pressure between the upstream region and the downstream region exceeds a desired value.

According to another embodiment of the invention, a method of regulating fluid flow between an upstream region and a downstream region includes providing a fluid entry member having at least one regulating aperture exposed to the upstream region and also having a second aperture. The method also includes decreasing the area of at least one regulating aperture that is exposed to the upstream region as a pressure differential between the upstream region and the downstream region increases. The method also includes blocking any flow of fluid through the second aperture when the pressure differential between the upstream region and the downstream region exceeds a predetermined level.

Embodiments of the invention provide numerous technical advantages. For example, in one embodiment of the invention, a constant rate control valve is provided that terminates fluid flow upon experiencing a pressure differential in excess of a predetermined pressure. Such a device may prevent the unwanted discharge of fluid in situations in which such discharge may be dangerous.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 4 is a sectional view cut along a center axis of the constant flow rate valve of FIG. 2 and positioned within a conduit of FIG. 1 in an open position, showing the fluid flow paths through the valve;

FIG. 5 is a sectional view cut along a center axis of the constant flow rate valve of FIG. 2 and positioned within a conduit of FIG. 1 in a closed position.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 1:
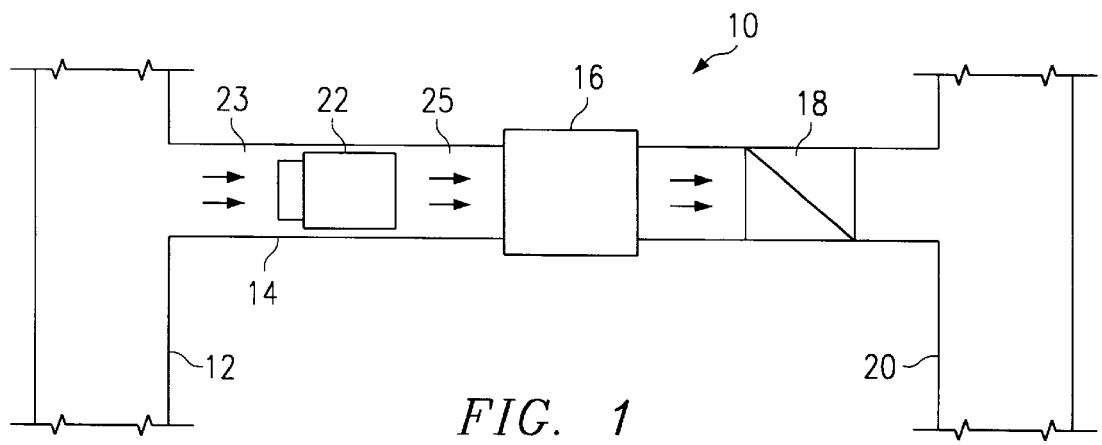
FIG. 1 is a schematic diagram illustrating the use of a constant flow rate control valve incorporating the teachings of the present invention in a piping system.

FIG. 1 is a schematic diagram illustrating the use of a constant flow rate valve 22 incorporating the teachings of the present invention in a piping system 10. Piping system 10 includes a fire protection loop 12. Fire protection loop 12 includes a large capacity pipe for carrying water for use in fighting fires. Water within this loop may also be used in connection with heating and cooling of a building. For example, a plastic water conduit 14 provides water to an air conditioning unit 16. A check valve 18 may be used to provide water to a chiller through conduit 20. Constant flow rate valve 22 may be incorporated within plastic water conduit 14 for regulating fluid flow from pipe 12 to air conditioning unit 16.

According to the teachings of the present invention, constant flow rate valve 22 regulates fluid flow within, for example, plastic water conduit 14 and maintains a substantially constant flow rate to, for example, air conditioning unit 16 for a range of pressure differentials between an upstream region 23 and a downstream region 25 of plastic water conduit 14. In addition, constant flow rate valve 22 prevents the flow of fluid for pressure differentials between upstream region 23 and downstream region 25 that exceed the range in which constant flow rate valve 22 regulates flow within plastic water conduit 14 to a substantially constant flow rate.

The ability to prevent fluid flow in the event of large pressure differentials across constant flow rate valve 22 may be particularly advantageous in the case in which conduit 14, for example, in downstream region 25 ruptures. For example, a rupture may occur from a fire. In such a case, the resulting loss in pressure in downstream region 25 causes an increase in pressure differential between upstream region 23 and downstream region 25. Such an increase in pressure differential would increase the fluid flow for pressure differentials that exceed the control range of constant flow rate valve 22. The increased fluid flow would drain fluid from fire protection loop 12. Such drainage is disadvantageous, particularly during a fire. Thus it is advantageous to provide a constant flow rate valve 22 that can both regulate flow to a fairly constant rate over a range of pressure differentials as well as prevent fluid flow for pressure differentials that exceed a given value. Details of one embodiment of constant flow rate valve 22 are described in conjunction with FIGS. 2 through 6 below.

Figure 2:
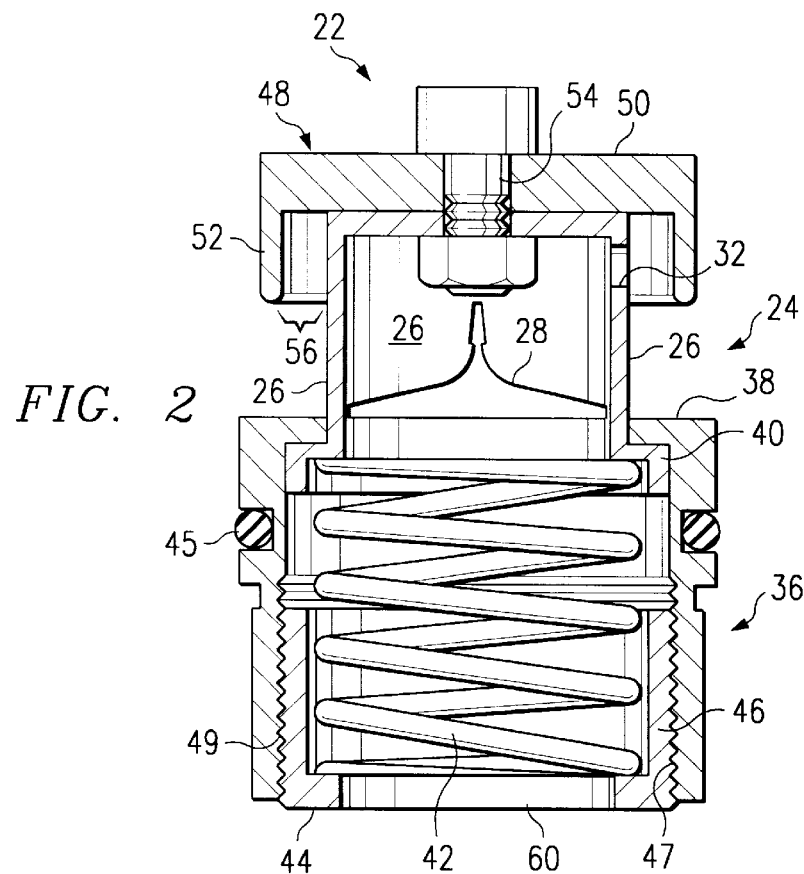
FIG. 2 is a sectional view cut along a center axis of a constant flow rate valve according to the teachings of the present invention.
Figure 3:
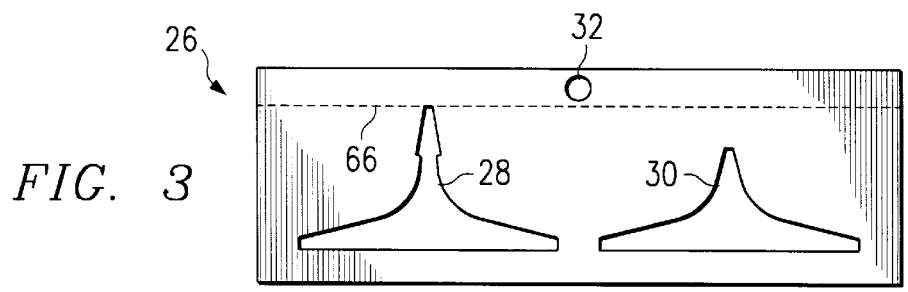
FIG. 3 is a diagrammatic view of a portion of the control valve view of FIG. 2 showing apertures in a sidewall of the control valve.

FIG. 2 is a sectional view of constant flow rate valve 22 cut through a center axis of the valve, and FIG. 3 is a diagrammatic view of a sidewall 26 of constant flow rate valve 22 showing a first regulating aperture 28, a second regulating aperture 30, and an orifice 32. Constant flow rate valve 22 includes a fluid entry housing or member 24. Fluid entry member 24 allows fluid to enter constant flow rate valve 22 from an upstream region, such as upstream region 23 illustrated in FIG. 1, through one or more apertures. In the embodiment, illustrated in FIG. 2, fluid entry member 24 includes a generally circular sidewall 26. As illustrated best in FIG. 3, sidewall 26 includes first regulating aperture 28, second regulating aperture 30, and orifice 32. As will be described in greater detail below, regulating apertures 28, 30, and orifice 32 allow fluid to flow from an upstream region, such as upstream region 23, to a downstream region, such as downstream region 25, through constant flow rate valve 22. As a pressure differential across constant flow rate valve 22 increases, the area through which fluid may flow through first regulating aperture 28 and second regulating aperture 30 is decreased, as described in greater detail below, in order to maintain a relatively constant flow rate through constant flow rate valve 22.

Fluid entry member 24 is movably disposed within a housing 36. A retainer ring 38 is provided within housing 36 to limit axial movement of fluid entry member 24 toward an upstream side of constant flow rate valve 22. When no fluid is flowing through constant flow rate valve 22, a surrounding flange 40 on fluid entry member 24 is urged against the downstream side of retainer ring 38, toward the upstream side of constant flow rate valve 22, by the force of a partially compressed spring 42. Spring 42 is partially compressed between the upstream side of an end wall 44 of housing 36 and a downstream side of flange 40. End wall 44 is formed with an adjustable end cap 46. Adjustable end cap 46 includes external threads 47 for mating with internal threads 49 of housing 36. Adjustable end cap 46, and therefore end wall 44, may be selectively positioned axially with respect to housing 36 by rotation of adjustable end cap 46 with respect to housing 36 at external threads 47 and internal threads 49. Selective positioning of end wall 44 allows compression of spring 42 to a desired level. An o-ring 45 is also provided on the exterior of housing 36 to prevent fluid from passing around the exterior of constant flow rate valve 22. Housing 36 includes a fluid exit 60 for allowing fluid to exit constant flow rate valve 22.

A shut-off member 48 prevents the flow of fluid into orifice 32 for pressure differentials that exceed the control range of constant flow rate valve 22. The control range of constant flow rate valve 22 is the range of pressure differentials between upstream region 23 and downstream region 25 over which the flow of fluid through constant flow rate valve 22 is substantially constant. In the embodiment illustrated in FIG. 2, shut-off member 48 includes a flat portion 50 and a generally circular sidewall 52. Sidewall 52 of shut-off member 48 encircles sidewall 26 of fluid entry member 24. Shut-off member 48 may be affixed to fluid entry member 24 by, for example, a screw 54. Alternatively, shut-off member 48 may be formed integral with fluid entry member 24. A clearance 56 is provided between sidewall 52 of shut-off member 48 and sidewall 26 of fluid entry member 24 to allow fluid to flow into orifice 32 when constant flow rate valve 22 is in an "open" position. In a "closed" position, shut-off member 48 prevents the flow of fluid through orifice 32. As described in greater detail below, shut-off member 48 terminates flow of fluid through constant flow rate valve 22 when the pressure differential across constant flow rate valve 22 exceeds a particular value.

FIG. 4 is a sectional view of constant flow rate valve 22 in an open position and cut along a center axis of the valve and positioned within conduit 14 of FIG. 1. FIG. 4 also shows the fluid flow paths through the valve. Fluid enters constant flow rate valve 22 through orifice 32 in fluid entry member 24, as illustrated by arrow 54, and proceeds through constant flow rate valve 22, exiting through fluid exit 60, as denoted by arrow 60. Fluid also enters constant flow rate valve 22 through regulating apertures 28, 30 as denoted by arrows 62. Fluid entering through regulating apertures 28, 30 proceeds through constant flow rate valve 22 and exits through fluid exit 60, denoted by arrows 62. The above-described flow paths exist for pressure differentials within the control range of constant flow rate valve 22. For pressure differentials that exceed the control range of constant flow rate valve 22, flow is terminated. Termination of fluid flow is accomplished by shut-off member 48 preventing flow through orifice 32, as described in greater detail in conjunction with FIG. 5.

In the existence of a pressure differential within the control range of constant flow rate valve 22, the differential pressure acting on the flat portion 50 of shut-off member 48 and the downstream side of fluid entry member 24 compresses spring 42. A greater pressure differential causes downstream movement of shut-off member 48 and fluid entry member 24 within constant flow rate valve 22. Movement of fluid entry member 24 toward the downstream side of constant flow rate valve 22 decreases the effective area of regulating apertures 28 and 30. The effective area of regulating apertures 28 and 30 is changed as regulating apertures 28 and 30 move relative to housing 36 and are covered by housing 36. This variation in the effective area regulating apertures 28 and 30 is responsive to the pressure differential acting on flat portion 50 and the downstream side of fluid entry member 24.

To provide a controlled rate of flow when a varying pressure differential exists, the area of regulating apertures 28 and 30 must be constantly changed to provide a constant flow rate condition. The size of orifice 32 is selected to allow passage of desired flow rate at the maximum pressure differential of the desired control range. Orifice 32 is illustrated as circular; however, other suitable configurations may be used for orifice 32. Appropriate dimensions and configurations for regulating apertures 28 and 30, and orifice 32, are described in U.S. Pat. No. 4,766,928 to Golestan, et al., entitled "Constant Flow Rate Control Valve" and U.S. Pat. No. 5,174,330 to Golestan, et al., entitled "Constant Flow Rate Control Valve with Low Pressure Drop Start," which are both incorporated herein by reference.

FIG. 5 is a sectional view of the constant flow rate valve 22 in a closed position and cut along the center of the valve and positioned within conduit 14 of FIG. 1. In a closed position, shut-off member 48 of constant flow rate valve 22 abuts a top portion 64 of housing 36 and therefore prevents any flow of fluid through orifice 32. By preventing flow of fluid through orifice 32, shut-off member 48 prevents any flow of fluid through constant flow rate valve 22 for pressure differentials exceeding a predefined value.

In the illustrated embodiment, sidewall 52 extends to approximately top of regulating aperture 28, as indicated by a dashed line 66, which is also illustrated in FIG. 3, to restrict fluid flow through constant flow rate valve 22 once pressure differentials exceed the control range of constant flow rate valve 22. Therefore, once the pressure differential across constant flow rate valve 22 is great enough that regulating apertures 28 and 30 are contained within housing 36, sidewall 52 of shut-off member 48 abuts against top portion 64 of housing 36, preventing fluid flow through clearance 56 and orifice 32.

Figure 6:
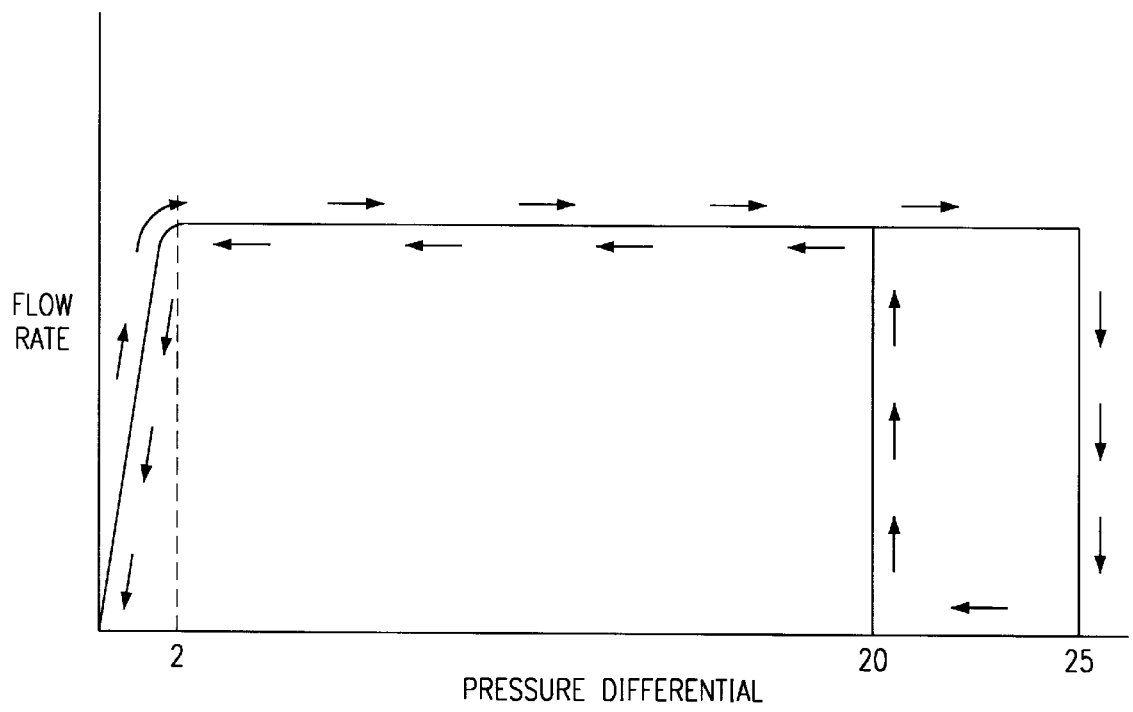
FIG. 6 is a graph of the flow rates through the constant flow rate valve of FIG. 2 for a range of pressure differentials across the valve.

FIG. 6 is a graph of the flow rates through constant flow rate valve 22 for various pressure differentials across the valve. As illustrated, a constant flow rate is achieved over a range of pressure differentials. When a pre-defined maximum pressure is reached, which in this example is 25 psi, flow through the valve is completely shut off. Due to frictional effects, flow is not re-initiated until the pressure differential has dropped to, in this example, 20 psi. At 20 psi, shut-off member 48 no longer prevents passage of fluid through constant flow rate valve 22. Therefore, the flow rate through constant flow rate valve 22 returns to its regulated constant value.

Although the present invention and its advantages have been described in detail, it should be understood the various changes, substitutions, and alterations can be made therein without departing from the spirit and scope of the present invention as defined by the appended claims.

What is claimed is:

1. A fluid valve for controlling flow of a fluid from an upstream region to a downstream region, the fluid valve comprising:

a generally cylindrical housing having a fluid entrance and a fluid exit;

a fluid entry member having a generally cylindrical sidewall formed with at least one regulating aperture for receiving fluid from the upstream region, the side wall further formed with a second aperture for receiving fluid from the upstream region, the fluid entry member movably disposed within the housing such that the at least one regulating aperture has a total area exposed to the upstream region sufficient to allow a substantially constant rate of fluid flow through the fluid valve over a range of pressure differentials between the upstream region and the downstream region; and a cap having a first end and a peripheral sidewall, the first end coupled to an end of the fluid entry member opposite the housing, the peripheral sidewall engaging the housing and preventing fluid flow through the valve when the difference in fluid pressure between the upstream region and the downstream region exceeds a desired value, and wherein the second aperture is positioned closer to the cap than the at least one regulating aperture.

2. The valve of claim 1, and further comprising an elastic member opposing, in at least one direction, motion between the housing and the cap.

3. The valve of claim 1, wherein the fluid entry member and the cap define a clearance region.

4. The valve of claim 1, wherein the cap is formed integral with the fluid entry member.

5. The valve of claim 1, and further comprising a screw coupling the cap to the fluid entry member.

6. A fluid valve for controlling flow of a fluid from an upstream region to a downstream region, the fluid valve comprising:

a generally cylindrical housing having a fluid entrance and a fluid exit;

a fluid entry member having a generally cylindrical sidewall formed with at least one regulating aperture for receiving fluid from the upstream region, the side wall further formed with a non-regulating orifice positioned further upstream than the at least one regulating aperture for receiving fluid from the upstream region, the fluid entry member movably disposed within the housing such that the at least one regulating aperture has a total area exposed to the upstream region sufficient to allow a substantially constant rate of fluid flow through the fluid valve over a range of pressure differentials between the upstream region and the downstream region; and a cap having a first end and a peripheral sidewall, the first end coupled to an end of the fluid entry member opposite the housing, the peripheral sidewall engaging the housing and preventing fluid flow through the valve, including the non-regulating orifice, when the difference in fluid pressure between the upstream region and the downstream region exceeds a desired value.

7. The fluid valve of claim 6, wherein the peripheral sidewall of the cap and the sidewall of the fluid entry member define a clearance region.

8. The fluid valve of claim 6, wherein the non-regulating orifice is generally circular.

* * * * *